(No Model.)
G. E. TEEGARDIN.
FLOOD GATE.
No. 387,020. Patented July 31, 1888.
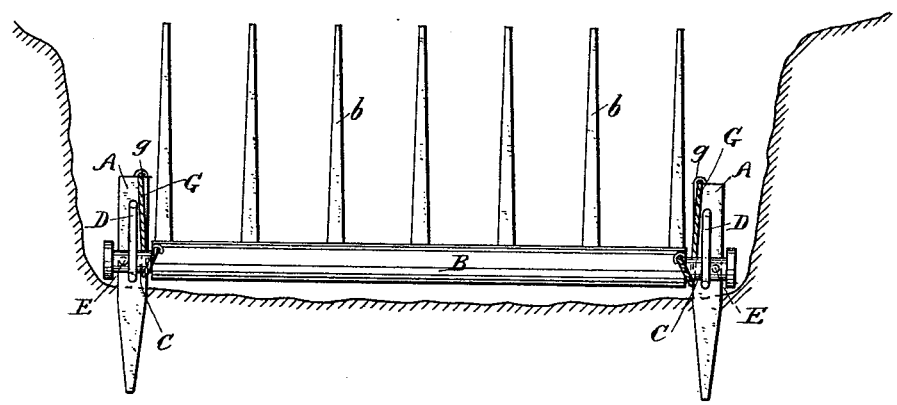
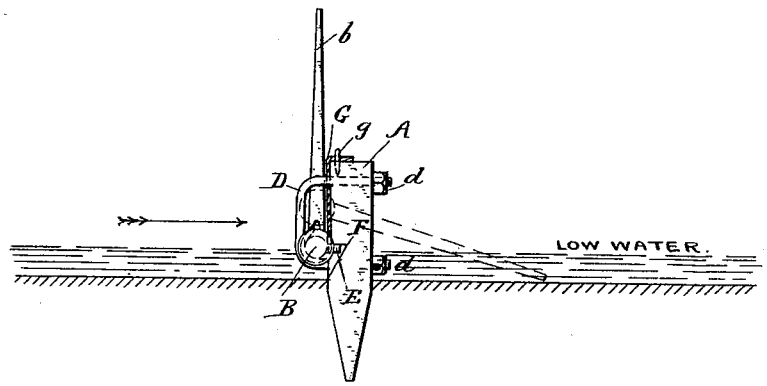
Witnesses.
W. L. Porter.
L. B. Porter.
Inventor,
Geo. E. Teegardin.
By his Attorney
Herbert W. T. Jenner.

UNITED STATES PATENT OFFICE.

GEORGE E. TEEGARDIN, OF ST. PAUL'S, OHIO.

FLOOD-GATE.

SPECIFICATION forming part of Letters Patent No. 387,020, dated July 31, 1888.

Application filed May 4, 1888. Serial No. 272,799. (No model.)

*To all whom it may concern:*

Be it known that I, GEORGE E. TEEGARDIN, a citizen of the United States, residing at St. Paul's, in the county of Pickaway and State of Ohio, have invented certain new and useful Improvements in Flood-Gates; and I do hereby declare the following to be a full, clear, and exact description of the invention, such as will enable others skilled in the art to which it appertains to make and use the same.

This invention relates to flood gates; and it consists in the novel construction and combination of the parts, hereinafter fully described and claimed.

In the drawings, Figure 1 is a front view of the gate, showing it stretched across a water-course when the stream is low. Fig. 2 is an end view of the same, and the broken lines indicate the position of the gate when the stream is up.

A are strong stakes, which are driven into the ground at the sides of the water-course.

B is a horizontal bar of wood provided with a series of pickets, b, which stand vertically when the stream is low and effectually prevent animals from passing up or down the water-course.

The bar B is provided with journals C at each end, resting on the bottoms of loops D, which project from the stakes A, and are firmly secured to the said stakes by nuts d, or in any other convenient manner. The loops D are elongated in a vertical direction, so that the bar is free to rise, but is kept in position laterally.

E are pins which project from the journals C and engage with the notches F in the stakes A.

G are flexible ropes of wire or cord, or chains may be used, if desired. One end of each rope is secured to the top of one of the stakes by a staple, g, and the rope passes downward around the journal C, and is secured to the upper side of the bar B by a similar staple, or by any other convenient fastening.

The direction of the stream is indicated by the arrow in Fig. 2. When the water rises, the horizontal bar rises with it, and being held by the pins E upon one side the said bar revolves in the loops D and winds upon itself the flexible ropes. The pickets are turned down out of the way of being injured, and a free passage is afforded to anything which may be brought down by the flood. When the stream subsides and the water-course again becomes passable, the weight of bar B causes it to unwind itself from the ropes and the pickets are restored to their vertical position.

What I claim is—

1. In a flood-gate, the combination, with the stakes provided with elongated guide loops, of the horizontal bar having its ends inserted in and resting upon the bottom of the said loops and provided with pickets, and the flexible ropes secured to said stakes and passing around the said bar, so that the gate is operated by the stream, substantially as and for the purpose set forth.

2. In a flood-gate, the combination, with the stakes provided with elongated guide-loops and with notches F, of the horizontal bar having its ends inserted in said loops and provided with pickets, and with pins E engaging with the said notches in the stakes, and the wire ropes secured to the stakes and passing around the said bar, so that the gate is operated by the stream, substantially as and for the purpose set forth.

In testimony whereof I affix my signature in presence of two witnesses.

GEO. E. TEEGARDIN.

Witnesses:
CHARLES DRESBACH,
S. C. GAMBLE.